United States Patent Office 3,532,701
Patented Oct. 6, 1970

3,532,701
VAPOR PHASE PRODUCTION OF PERCHLORINATED PYRIDINE AND CYANOPYRIDINES FROM CYANO-SUBSTITUTED CYCLOBUTANES AND CYCLOBUTENES
Michael J. Marinak, Walnut Creek, Calif., assignor to The Dow Chemical Company, Midland, Mich., a corporation of Delaware
No Drawing. Filed Jan. 18, 1968, Ser. No. 698,714
Int. Cl. C07d 31/02
U.S. Cl. 260—290                    7 Claims

ABSTRACT OF THE DISCLOSURE

A novel process is disclosed whereby perchlorinated pyridine and cyanopyridine compounds can be prepared by a process of vapor phase chlorination from cyano-substituted cyclobutanes and cyclobutenes. Thus, pentachloropyridine can be produced from the monocyano-substituted starting materials, while isomeric tetrachlorocyanopyridines can be produced from the dicyano-substituted derivatives. The process is one whereby mixed vapors of the cyano-substituted, $C_4$ cycloaliphatic reactant and chlorine are reacted together in the presence of a diluent gas at temperatures of from at least 400° C. to about 700° C.

BACKGROUND OF THE INVENTION

Cyano-substituted, $C_4$ cycloaliphatic compounds, including 1,2-dicyanocyclobutane, have heretofore been subjected to a variety of chlorination processes. All have been conducted in the liquid phase at temperatures below 200° C. to produce lower chlorinated derivatives of the cyano-substituted starting materials. These known chlorination processes have neither perchlorinated the reactant compound nor have they changed the fundamental character of the ring. This is in contrast to the process of the present invention which expands the cyano-substituted, 4-member carbon ring to a 6-member heterocyclic ring, while at the same time effecting simultaneous perchlorination and aromatization thereof to provide perchlorinated pyridine and cyanopyridine compounds in good yields and with no substantial formation of tar and other undesirable by-products.

SUMMARY OF THE INVENTION

According to the present invention, it has been discovered that cyano-substituted $C_4$ cycloaliphatic compounds can be converted to perchlorinated pyridine and cyanopyridine compounds in a method whereby well mixed vapors of the $C_4$ cycloaliphatic reactant and chlorine present in excess are reacted together in the presence of a diluent gas at temperatures in a range of at least 400° C. to about 700° C. The reaction proceeds in a rapid manner and affords good yields of the desired compounds. When conducted under optimum conditions the reaction product is substantially free of tars and undesired decomposition products.

In this chlorination process the $C_4$ ring of the cyano-substituted starting material opens and the carbon and nitrogen atoms of a cyano substituent group are introduced into the ring to form the 6-membered heteronitrogen, pyridine ring. This ring expansion is accompanied by reactions of simultaneous chlorination and dehydrochlorination (or aromatization) which lead to the formation of perchlorinated pyridine and cyanopyridine compounds. In the case of $C_4$ cycloaliphatic starting compounds which are substituted by a single cyano group, the reaction product is rich in pentachloropyridine, while with dicyano-substituted reactants the product is made up largely of the isomeric 2-, 3- and 4-cyanotetrachloropyridines together with small amounts of pentachloropyridine. These perchlorinated reaction products have utility as pesticides and as intermediates for the preparation of many substituted pyridines and pyridyl-substituted compounds. For example, pentachloropyridine can be used as a herbicide in the control of undesirable plants and weed seeds, while the various isomeric tetrachlorocyanopyridines have good fungicidal characteristics and can be used for the control of soil-dwelling fungi.

The terms "cyano-substituted, $C_4$ cycloaliphatic" compounds, or simply "cycloaliphatic" starting materials or compounds, are employed herein to designate mono- and dicyano-substituted cyclobutane and cyclobutene compounds. Said terms also include those cyclobutane and cyclobutene compounds which incorporate one or more chloro groups as neutral ring substituents in addition to the cyano group or groups which are present on the $C_4$ ring. Representative cyano-substituted $C_4$ cycloaliphatic starting materials which may be chlorinated and converted to perchloropyridine and perchlorocyanopyridine products by the process of this invention include cyanocyclobutane, 1,2- dicyanocyclobutane (otherwise referred to as cyclobutane-1,2-dicyanide), chloro - 1,2-dicyanocyclobutanes, 1,2-dichloro - 1,2-dicyanocyclobutane, 1,3-dicyanocyclobutane, 1-cyanocyclobutene, 1,2-dicyanocyclobutene-1, 3,4-dicyanocyclobutene-1, 2,3-dicyanocyclobutene-1, 1,3-dicyanocyclobutene-1 and 1,2-dichloro-1,2-dicyanocyclobutene-1. Many of these compounds are readily available, and all can be synthesized by conventional preparatory techniques. Thus, 1,2-dicyanocyclobutane, the preferred compound for use in the process of this invention, can be prepared by the irradiation of acrylonitrile with either visible or ultra-violet light, the product being distilled from the resulting polymerization product as a mixture of the cis and trans forms. Either the cis or trans forms of 1,2-dicyanocyclobutane, or a mixture thereof, can be used with equally good effect as the starting material to form the various 2-, 3- and 4-cyanotetrachloropyridine compounds. The starting materials 1-chloro-1,2-dicyanocyclobutane and 1,2-dichloro-1,2-dicyanocyclobutane, as well as 1,2-dicyanocyclobutene-1, are produced when 1,2-dicyanocyclobutane is chlorinated in carbon tetrachloride in the presence of hydrogen chloride and ultra-violet light irradiation. Corresponding mono- and dichlorodicyanocyclobutenes can be prepared by similar techniques. Cyanocyclobutane can be prepared from cyclobutane carboxylic acid by esterifying and then amidating the carboxyl group, with the amide then being dehydrated with phosphorous pentoxide to form the corresponding nitrile. Cyclobutane carboxylic acid also can serve as a starting material to prepare 1-cyanocyclobutene. In this case the acid is first brominated to form α-bromocyclobutane carboxylic acid. The carboxyl group is then converted to a nitrile group in the manner outlined above, and the resulting intermediate is dehydrobrominated, as with potassium methylate in methanol, to form 1-cyanocyclobutene. 1,3-dicyanocyclobutane can be prepared from cyclobutane-1,3-dicarboxylic acid using the ester, to amide, to nitrile synthesis route. 3,4-dicyanocyclobutene-1 and 2,3-dicyanocyclobutene-1 can be prepared by reacting 1,2-dicyanocyclobutane with bromine in an anhydrous system to form 3-bromo-1,2-dicyanocyclobutane and 3,4-dibromo-1,2-dicyanocyclobutane. These brominated products are then dehydrobrominated with potassium methylate in methanol to form the desired dicyanocyclobutene starting materials. Alternatively, the 3,4-dibromo-1,2-dicyanocyclobutane can be converted to 3,4-dicyanocyclobutene-1 by treatment with zinc dust in the presence of a suitable liquid reaction medium. 1,3-dicyanocyclobutene-1 can be prepared by bromination of 1,3-dicyanocyclobutane, followed by dehydrobromination as described above.

To provide the diluent gas which is present during the reaction there may be employed materials which are either vaporous or readily vaporized and which are substantially inert under the reaction conditions employed. Included are nitrogen, carbon dioxide, hydrogen chloride and sulfur dioxide, as well as perchlorinated hydrocarbons. Also included are chlorohydrocarbons such as chloroform which can be employed as diluent provided sufficient additional chlorine is supplied to accommodate the conversion thereof to a perchlorohydrocarbon in the reaction zone. The preferred diluents are volatile perchlorinated hydrocarbons such as tetrachloroethylene, hexachlorobutadiene and carbon tetrachloride, as well as mixtures of one or more of said compounds with chloroform. It is also possible to practice the invention by employing as the sole "diluent" gas a large excess of the chlorine reactant over and above the stoichiometric chlorine requirement.

In practicing the present invention, an excess of chlorine is employed. The term "excess chlorine," as employed herein, designates chlorine employed in an amount over and above that which is stoichiometrically required to effect aromatization and perchlorination of the cyano-substituted, $C_4$ cycloaliphatic starting material to form the perchlorinated pyridine and cyanopyridine products, together with hydrogen chloride and other by-products. The stoichiometric chlorine requirement also includes that which may be consumed by conversion of the diluent to a perchlorinated hydrocarbon, as referred to above. The minimum stoichiometric requirements for chlorine are ½ mole for each hydrogen atom carried on the ring of the starting compound and ½ mole for each chlorine atom to be attached to the ring to form the perchlorinated product. Thus, perchlorination of cyanocyclobutane requires 6 moles of chlorine, while 5 moles are required for the perchlorination of dicyanocyclobutane. Those cycloaliphatic starting materials which already incorporate chloro groups require proportionally less chlorine. In carrying out the invention there preferably is employed at least a 20 percent excess of chlorine (over and above the stoichiometric requirement), and in a more preferred practice of the invention there is employed at least a 100 percent excess of chlorine. A 3 to 15× or even larger excess of chlorine over the stoichiometrically required amounts can also be employed with good results, and employed in such relatively large amounts the excess chlorine serves a substantial diluent function as well as a reactant function and thus makes it possible to reduce the content of inert vaporous diluent or to omit the same altogether, if desired. However, even when employing a large excess of chlorine, i.e., at least a 3× excess, one or more inert diluents such as vaporous carbon tetrachloride or the like are preferably employed so as to effect better control over the reaction and reduce any tendency toward the formation of tarry and other undesirable by-products.

The amount of inert diluent to be employed is not critical and good results can be obtained by using from about 3 to at least 50 moles of this diluent per mole of the heterocyclic nitrogen starting compound, and such a range is preferred whether or not there is also employed a large excess of chlorine.

In carrying out the process of this invention, the vapors of the cyano-substituted $C_4$ cycloaliphatic compound or a mixture of said compounds, together with an excess of chlorine and any inert diluent gas employed, are introduced into a reaction zone maintained at temperatures falling within a range of from at least 400° C. to about 700° C. It is important to an efficient practice of the present invention that the vapors admitted to the reaction zone be well mixed, and preferably said mixture is in a condition of turbulent flow as it is brought up to reaction temperatures above about 400° C.

It is among the advantages of the present process that when the mixed vaporous reactants and diluent gas or gases are brought to the recited reaction temperatures, an overall exothermic, homogeneous reaction rapidly ensues. However, due to the presence of the diluent gases it may be necessary to supply the reaction zone with external heat in order to maintain the temperature at the desired level. It is a further advantage that the reaction proceeds to good yields of desired products without the use of heterogeneous or actinic catalysis, and with little formation of tars and other undesirable by-products.

Preferred conditions for carrying out the reaction are determined by the product or products desired. Thus, desirable ratios of chlorine and diluent gases to the cyano-substituted, $C_4$ cycloaliphatic starting compound, residence times and reaction temperatures vary somewhat depending on the nature of the reactant and on the degree of chlorination of the starting materials. As noted, chlorine itself may be a neutral substituent on the cyano-substituted, $C_4$ cycloaliphatic reactant compound, and such partially chlorinated compounds may be further chlorinated and ring-expanded in the present process. This embodiment of the invention is of particular importance from the standpoint of enabling recycle of incompletely chlorinated products recovered from the reaction product when the process is operated in a continuous fashion.

The reaction step of the present invention takes place very rapidly and is capable of providing good yields of the desired pyridine and cyanopyridine products. Although the duration of the reaction, i.e., the residence time spent by the reaction mixture in the reaction zone, is not critical, the reactants should not be permitted to remain in contact with one another for a prolonged period once they have been brought to reaction temperatures above about 400° C. This reaction period, which generally will not exceed 5 to 6 minutes, depends somewhat on the particular temperature employed within the operable range of temperatures for given reactants and products. Thus, lowering the temperature ten degrees may lengthen the permissible reaction time, though such changes will ultimately be limited by the operable range for obtaining a particular product. The preferred residence time is from about 5 to 30 seocnds for temperatures above about 500° C., though residence times of only 1 to 3 seconds may suffice at temperatures above about 650° C.

Within the broadly operable reaction temperature range of from at least 400° C. to about 700° C., a preferred temperature range is from about 500° C. to 650° C. The optimum temperature to employ for a given preparation may vary somewhat depending on the nature of the cycloaliphatic starting material, the presence or absence of a recycle stream, and the nature and/or magnitude of the excess of chlorine and of any other diluent gas employed. When operating with any particular feed composition and with given feed/chlorine/diluent ratios, one or a few range-finding preparations will suffice for a proper determination of the optimum temperature and residence time for obtaining desirable yields of particular products.

Operating pressures to be maintained during the reaction are not critical and may vary from subatmospheric to somewhat superatmospheric. Atmospheric pressures are satisfactory and preferred.

In carrying out the reaction for the preparation of the perchlorinated pyridine and/or cyanopyridines, the cyano-substituted $C_4$ cycloaliphatic starting compound and inert diluent, if employed, are vaporized by passing said compounds through a suitable evaporator maintained at a temperature high enough to effect vaporization of the cycloaliphatic feed and of any diluent employed and to bring the resultant vapors up to temperatures of from about 100° C. to 400° C. or higher. Preferably, a diluent is employed which, in liquid form, is miscible with the cycloaliphatic feed compound or is capable of dissolving the same. The resulting liquid is that which is passed through the evaporator. If it proves to be impractical to use a diluent of this character, the desired good mixing of the feed and diluent vapors can also be obtained by separately vaporizing the feed and diluent components and then bringing the hot vapors together for mixing with the chlorine reactant. Any suitable vaporizing device can be employed as an evaporator, and an inclined tube jacketed with heating coils or a wiped film evaporator have been found to be convenient. For efficient operation it is necessary that the feed rate and/or temperature of the evaporator be maintained so as to completely vaporize the cycloaliphatic reactant and maintain it in the vaporized state. Incomplete vaporization results in decreased yields of the desired perchlorinated products.

The hot vapors from the evaporator are mixed with excess chlorine, said mixing preferably taking place just prior to the point of entry of the feed stream to the reactor. The resulting gaseous mixture is introduced at a rapid rate into a reactor maintained at a temperature of from at least 400° C. to about 700° C. Preferably the mixed gases entering the reactor are in a state of turbulent flow such as to provide a Reynolds number of at least 800 and, more preferably, of at least 2000. The ensuing reaction which takes place under these temperature conditions is formative of pentachloropyridine and/or tetrachlorocyanopyridine compounds, together with hydrogen chloride and various other compounds as byproducts. In one preferred embodiment, the mixing of the reactants is accomplished in a nozzle from which the mixture is rapidly injected in turbulent flow into the heated reactor. Generally, an inlet vapor velocity of the feed into the heated reaction zone of from about 40 to 150 feet per second is considered desirable. Alternatively, the diluent-containing vapors of the cycloaliphatic compound and the chlorine may be simultaneously but separately introduced into the reactor. In this method the chlorine is jetted in at a point close to the point of introduction of the cycloaliphatic compound in such manner as to ensure rapid mixing and turbulent flow of the reactants as they are discharged into the reactor.

Any suitable reactor can be employed, and since the reaction is exothermic, strong heating may be required only at the initiation of the reaction. Thereafter heat is applied only as required to maintain the reaction mixture at the desired temperature. Accordingly, the reactor should be provided with a heating coil or other heating means so as to bring the entrant feed gases rapidly up to reaction temperatures and to maintain said temperatures as the gaseous mixture is swept through the reaction zone. The inlets, outlets and interior surfaces of the reactor must be of materials such as are known to resist corrosion by chlorine and hydrogen chloride at high temperatures. Thus, for example, such surfaces may be lined with nickel, carbon, silica or glass. In practice, it has been found that thermally resistant, high-silica glass such as Vycor brand is satisfactory for small reactors. In large scale apparatus it is convenient to employ a shell of nickel lined with fused silica or a suitable refractory such as carbon. In a preferred form of apparatus the reactor proper is in the form of a cylinder having a length of 4 to 6 times its diameter. Conventional accessories, such as flowmeters on the inputs and condensors, cooling tubes or a quench tower for the exit gases are employed.

To accomplish the rapid and preferably rapid turbulent mixing and introduction of the reactants into the reaction zone, the reactor may be fitted with a mixing nozzle, as described above. Alternatively, the vaporous cycloaliphatic reactant, diluent and the chlorine may be introduced into the reactor by separate orifices adjusted so that the chlorine is jetted into the incoming stream or streams of vaporous cycloaliphatic reactant and diluent. In a further embodiment wherein the vaporous cycloaliphatic reactant, diluent and chlorine are introduced into the reactor with mixing immediately prior to such introduction, the mixing and introduction are carried out in a tube or the like having a diameter which is small in relation to the diameter of the reactor whereby turbulence at the entrance is achieved at relatively low Reynolds numbers in accordance with known principles.

The vapors passing from the reactor are cooled or quenched to separate (a) a liquid mixture comprising perchlorinated or partially chlorinated pyridine and cyanopyridine products, inert diluent and any unreacted or partially reacted cyano-substituted $C_4$ cycloaliphatic compounds from (b) a gaseous mixture comprising chlorine, hydrogen chloride and any other gaseous by-products. Depending on the product sought from the reaction, the liquid mixture can be fractionally distilled under ambient or reduced pressures to recover the desired product or products either as distillate fractions or as a residue. Alternatively, the liquid may be cooled to precipitate the product which is then recovered by filtration. Materials not fully chlorinated can be recovered as such or recycled to the evaporator for further reaction. The separated gaseous mixture can be scrubbed according to conventional procedures to separate chlorine from the hydrogen chloride formed during the reaction. The former can be dried and recycled, while the latter can be recovered as hydrochloric acid or recycled in those cases where it performs a diluent function. The perchlorinated pyridine and cyanopyridine product compounds, whether recovered by distillation, by precipitation and filtration or by other known method, can be further purified by recrystallization from a solvent or by other methods well known to those skilled in the art.

The products produced by the method of this invention have known physical and chemical characteristics. They can thus be identified by appropriate analytical methods including infra-red absorption, gas liquid chromatography, mass spectography, elemental analysis, and nuclear magnetic resonance, among other methods.

In a preferred method for carrying out the process according to the present invention, an appropriate cyano-substituted $C_4$ cycloaliphatic reactant compound or mixture of said compounds, together with inert diluent, is introduced into a heated evaporator where the reactant and diluent are vaporized, the resulting hot effluent vapors from the evaporator are rapidly and thoroughly mixed with excess chlorine and introduced into a reactor maintained at temperatures of from at least 400° C. to about 700° C., the reactants are maintained in said reactor for a short period of time, and the reaction product is then conducted from the reactor and condensed. Following this the desired products are recovered from the liquid condensate by conventional procedures known to those skilled in the art.

DESCRIPTION OF THE PREFERRED EMBODIMENTS

The following examples illustrate the invention but are not to be construed as limiting:

Example 1

In this operation a solution of 17.6 grams (0.166 mole) of 1,2-dicyanocyclobutane in a mixture of 35 grams of chloroform and 125 grams of carbon tetrachloride is continuously metered under 5 p.s.i. nitrogen pressure from a feed reservoir through a heated evaporator tube at a rate of about 3.4 grams per minute. The temperature in the tube is such as to evaporate the feed stream and provide a vapor exit temperature of 400° C. Chlorine gas is continuously metered into the hot exit vapors from the evaporator at a rate of 7 grams per minute, the mole ratio of chlorine to 1,2-dicyanocyclobutane in the feed stream being about 29:1. This represents a chlorine excess of approximately 3.3× over the total stoichiometric chlorine requirement. The resulting gases are rapidly mixed and continuously jetted through the small orifice (0.25 cm. diameter) of a mixing nozzle at a rate of 100 feet per second into one end of a heated "Vycor" glass reactor having a 1.35 liter capacity and a length to diameter ratio of 5:1. The reactor temperature is maintained at 610° C. throughout the run, and the calculated residence time of the vapors in the reactor is about 9 seconds. The mixing nozzle is maintained at temperatures only slightly below those prevailing in the reactor. Under these conditions the gases passing through the nozzle and into the reactor are well mixed and in a highly turbulent condition. The reaction mixture on leaving the reactor is condensed in two consecutive cold traps cooled with a Dry Ice-dichloro-methylene mixture. The crude product mixture so recovered is slowly warmed to room temperature and the excess chlorine and hydrogen chloride are caught in a trap containing a 10 percent aqueous solution of sodium hydroxide. The residue is taken up in dichloromethane and filtered. The filtrate is then evaporated to dryness under reduced pressures, giving 23 grams of semi-solid residue. Gas liquid chromatographic (G.L.C.) analysis of the product through a column calibrated against authentic tetrachlorocyanopyridine isomers and pentachloropyridine shows the following components as identified by their infra-red-spectra and G.L.C. retention time:

|   | Mole percent |
|---|---|
| 3,4,5,6-tetrachloropicolinonitrile | 44.1 |
| 2,4,5,6-tetrachloronicotinonitrile | 27.8 |
| 2,3,5,6-tetrachloroisonicotinonitrile | 18.5 |
| Pentachloropyridine | 6.5 |
| Unidentified mixture of trichlorocyanopyridines | 1.1 |

The various pentachloropyridine and 2-, 3- and 4-cyanotetrachloropyridine compounds can be separated from one another by fractional distillation and redistillation, preferably under reduced pressures and with the use of distillation columns having a large number of theoretical plates. Separation can also be effected by preparative G.L.C. techniques.

Example 2

Using the equipment, and in a manner generally similar to that described in Example 1, a mixture of 2-, 3- and 4-cyanotetrachloropyridine isomers is obtained when the 1,2-dicyanocyclobutane reactant is replaced, in respective runs, by each of the compounds chloro-1,2-dicyanocyclobutane, 1,2-dichloro-1,2-dicyanocyclobutane, 1,3-dicyanocyclobutane and 1,2-dicyanocyclobutene-1.

Example 3

Using the equipment, and in a manner generally similar to that described in Example 1, but with the 1,2-dicyanocyclobutane starting material being replaced, in respective runs, by each of the compounds cyanocyclobutane and 1-cyanocyclobutene, there are obtained reaction products from which pentachloropyridine is recovered in good yields.

Example 4

Using the equipment, and in a manner generally similar to that described in Example 1, liquid 1,2-dicyanocyclobutane is fed through the evaporator at a rate of 0.35 grams per minute in the absence of chloroform, carbon tetrachloride or other inert diluent. The resulting vapors exit from the evaporator at a temperature of 300° C. and they are mixed in the nozzle with chlorine gas supplied at a rate of 8.5 grams per minute. The mole ratio of chlorine to 1,2-dicyanocyclobutane in the feed stream is about 35:1, this representing approximately a 5.8× excess of chlorine over the stoichiometric chlorine requirement. The mixed chlorinedicyanocyclobutane gases are rapidly and continuously jetted through the small orifice of the nozzle into the reactor at a rate of about 100 feet per second. The reaction temperature is 500° C., and the residence time of the vapors therein is calculated to be about 10 seconds. On terminating the run and working up the product in the manner described in Example 1, there is recovered a product from which 3,4,5,6 - tetrachloropicolinonitrile, 2,4,5,6 - tetrachloronicotinonitrile and 2,3,5,6 - tetrachloroisonicotinonitrile are recovered in good yield.

The products produced by the method of the present invention have numerous useful applications. They are useful as intermediates for the preparation of other chlorinated, heterocyclic nitrogen compounds. For example, pentachloropyridine can be reacted with sodium methylmercaptide to form 2,3,5,6-tetrachloro-4-methylthiopyridine which is then oxidized to the corresponding sulfone. The latter product is useful as a paint preservative and for other fungicidal applications.

All the products produced hereby have useful pesticidal characteristics. Thus, pentachloropyridine can be used for the control of undesirable plants and weed seeds. In representative operations, aqueous compositions containing pentachloropyridine give good control of vegetation such as wild oats when applied at a dosage level of 50 pounds per acre to soil planted therewith. The several 2-, 3- and 4-cyanotetrachloropyridine isomers have good fungicidal activity and each can be employed as a broad spectrum soil fungicide. Each gives complete control of soil dwelling fungi when the organisms are exposed to growth media containing said compound at a concentration of 100 parts per million parts by weight of the growth medium.

I claim:
1. A process for the production of perchlorinated pyridine and cyanopyridine compounds which comprises reacting mixed vapors of:
   at least one starting compound selected from group consisting of monocyano- and dicyano-substituted cyclobutanes, monocyano- and dicyano-substituted cyclobutenes and cyano-substituted cyclobutanes and cyclobutenes of this character which also contain at least one chloro group on the ring, said starting compounds having not more than one member selected from the group consisting of chloro and cyano on any single carbon atom,
   chlorine gas present in excess over the stroichiometrically required amount and
   a diluent gas substantially inert under the reaction conditions employed
at temperatures in a range of from at least 400° C. to about 700° C. whereby the monocyano-substituted starting compounds are converted to perchloropyridine and the dicyano-substituted starting materials are converted essentially to perchlorocyanopyridines.

2. The process as recited in claim 1 wherein said mixed vapors are introduced into a reaction zone maintained at a temperature in a range of from at least 400° C. to about 700° C., wherein the resulting reacting product mixture is withdrawn from said zone and wherein the perchlorinated products are recovered from the said mixture.

3. The process as recited in claim 1 wherein the starting compound is cyanocyclobutane and the product is pentachloropyridine.

4. The process as recited in claim 1 wherein the starting compound is 1-cyanocyclobutene and the product is pentachloropyridine.

5. The process as recited in claim 1 wherein the starting compound is 1,2-dicyanocyclobutane and wherein the product is essentially comprised of a mixture of 3,4,5,6- tetrachloropicolinonitrile, 2,4,5,6 - tetrachloronicotinonitrile and 2,3,5,6-tetrachloroisonicotinonitrile.

6. The process as recited in claim 1 wherein the starting compound is 1,2-dicyanocyclobutene-1 and wherein the product is essentially comprised of a mixture of 3,4,5,6 - tetrachloropicolinonitrile, 2,4,5,6 - tetrachloronicotinonitrile and 2,3,5,6-tetrachloroisonicotinonitrile.

7. A process in accordance with claim 2 wherein the diluent gas comprises a vaporized perchlorinated hydrocarbon.

References Cited

UNITED STATES PATENTS 3,463,781  8/1969  Bell et al. _____ 260—290

HENRY R. JILES, Primary Examiner

H. I. MOATZ, Assistant Examiner

U.S. Cl. X.R.

260—64, 294.9